No. 669,857. Patented Mar. 12, 1901.
L. RIEBE.
AUTOMATIC SKETCHING APPARATUS.
(Application filed June 26, 1900.)

(No Model.)

WITNESSES
B. Paterson,
M. J. Kelly.

INVENTOR
Louis Riebe
By Clark Raemer &
ATTYS

UNITED STATES PATENT OFFICE.

LOUIS RIEBE, OF LANSFORD, PENNSYLVANIA.

AUTOMATIC SKETCHING APPARATUS.

SPECIFICATION forming part of Letters Patent No. 669,857, dated March 12, 1901.

Application filed June 26, 1900. Serial No. 21,603. (No model.)

*To all whom it may concern:*

Be it known that I, LOUIS RIEBE, a citizen of the United States, and a resident of Lansford, county of Carbon, and State of Pennsylvania, have invented certain new and useful Improvements in Automatic Sketching Apparatus, of which the following is a specification, reference being had to the accompanying drawings, forming a part thereof, in which similar letters of reference indicate corresponding parts.

This invention relates to automatic sketching apparatus and embodies an automatic sketching device and a wheeled vehicle on which said device is carried and performs its operation.

The nature and objects of the invention will be fully understood from the following general description and the annexed drawings and will be subsequently pointed out in the claims.

Figure 1:
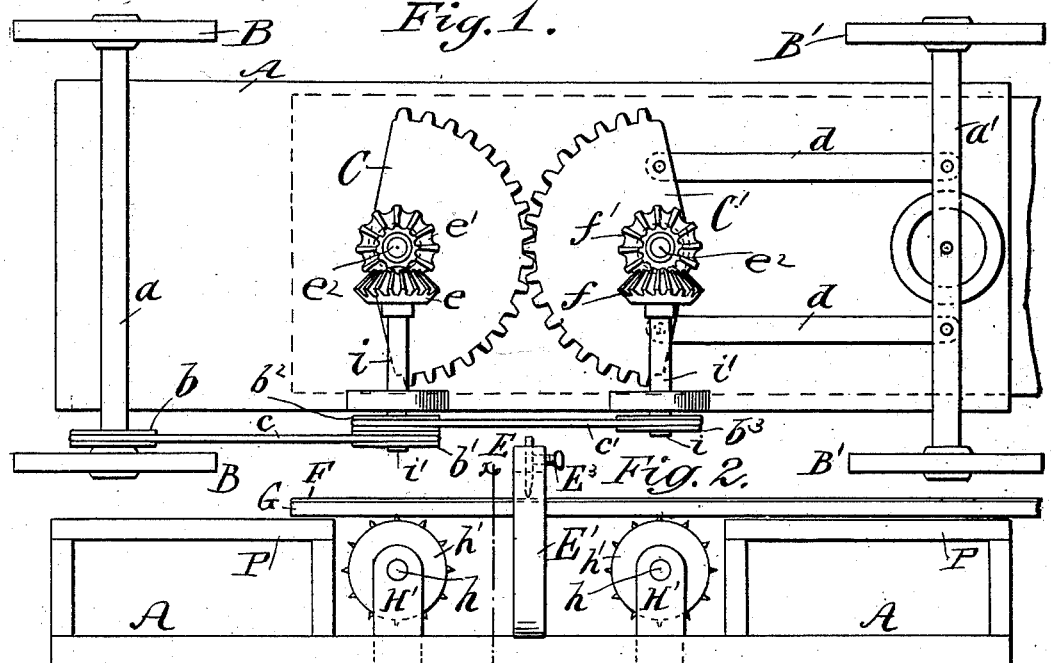
Figure 2:
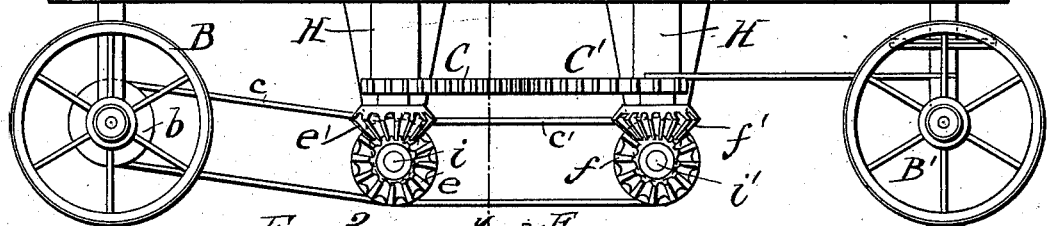
Figure 3:
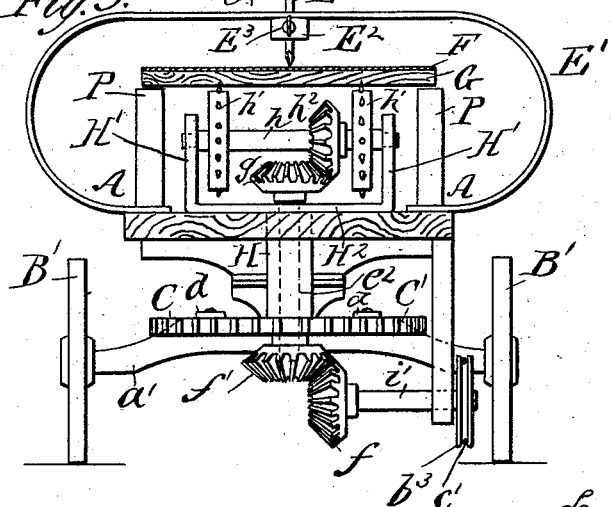

Figure 1 is a plan view of the vehicle inverted, showing a part of the mechanism. Fig. 2 is a side view in elevation of the same. Fig. 3 is a sectional view in elevation taken on the line $x\ y$ of Fig. 2.

This sketching apparatus has been devised to automatically delineate on a comparatively small scale the path traveled by the vehicle.

Referring to the drawings, which are hereby made a part of this specification, A designates the body of the vehicle, $a\ a'$ the axles, and B B' the wheels on which it is mounted. Two revoluble sleeves (designated by H) extend vertically upward from beyond the bottom into the bed of the vehicle. In the bed the upper end of each sleeve is formed into a bracket H' H$^2$ H', which turn with said sleeves. On the bottom end of these sleeves are mounted the segmental spur-wheels C and C', meshing together. Through these sleeves and beyond either end thereof extend the shafts $e^2$. On the bottom of these shafts are mounted the bevel-wheels $e'$ and $f'$. Upon the upper ends of these shafts are mounted the bevel-wheels $g$, meshing into the bevel-wheels $h^2$. These wheels $h^2$ are mounted on the shafts $h$, which are journaled in the brackets H' H$^2$ H'. On these shafts are also mounted the wheels $h'$, two on each shaft, one near each end. They are furnished with sharp conical teeth, as illustrated. The shafts $i$ and $i'$ are journaled in suitable bearings attached to the body A of the vehicle. The shaft $i$ carries the wheel $e$, meshing, respectively, into the wheels $f'$ and $e'$. The shaft $i$ also carries the two sheave-pulleys $b'$ and $b^2$, one, $b'$, in line with the sheave-pulley $b$ on the hub of the wheel B, the other, $b^2$, in line with the sheave-pulley $b^3$ on the shaft $l$. These four pulleys are connected by suitable belts $c\ c'$. Two bars $d\ d$ pivotally connect the segmental spur-wheel C' with the fore axle $a'$. G designates a platform resting on suitable supports in said body A, engaged by the teeth of the wheels $h'$ and movable upon its support P. F designates a sheet of paper spread on the platform G. A pencil (designated by E) is adjustably held in the hub E$^2$ by the thumb-screw E$^3$. The hub E$^2$ is held in its position by the curved bracket E'.

All the several parts of the apparatus are to be substantially as illustrated in the drawings.

When all the various parts of the device are in their proper places, as illustrated, if the vehicle be moved motion is transmitted from the hub of the wheel B through the mechanism to the wheels $h'$, which engage the platform G. If the vehicle be moved in a straight line, the shafts $h$ and $h$ will remain parallel to each other and parallel to the fore axle. In that case the platform G will be moved by wheels $h'$ backward in a straight line, and a straight line will be inscribed on the paper F by the pencil E; but if the vehicle be moved in a curve the fore axle, deflecting, and by reason of the bars $d$, turns the segmental wheel C', and it turns the segmental wheel C, meshing with it. This by reason of the mechanical construction described causes the shafts $h$ and $h$ to assume a position at angles with each other, turning with them the platform G out of a straight line as far as they go. This causes the pencil E to describe a curve on the paper F. If the vehicle pass through an entire circle, a circle will be inscribed on the paper, and if at any time the vehicle while describing a curve returns to a straight line the pencil will again inscribe a straight line on the paper, and thus the apparatus automatically delineates the path of the vehicle. The scale of the draft may be changed by exchanging the wheel $b$ for pulleys of different diameters, which will increase or decrease the speed of the wheels in the sketching mechanism, as these substitute pulleys may be larger or smaller and so increase or decrease the length of movement of the platform G in proportion to the distance traveled by the wheel B.

Having thus described my said invention, what I claim as new, and desire to secure by Letters Patent, is—

1. The combination with a vehicle comprising a body and supporting axles and wheels, of a train of wheels comprising horizontal shafts journaled on said body, bevel-wheels mounted on said shafts, vertical revoluble sleeves journaled in said body, segmental wheels meshing together upon the lower ends of said sleeves, and brackets upon the upper ends thereof, and turning therewith, vertical shafts revolving in said sleeves bevel-wheels on the lower ends of said vertical shafts engaging the bevel-wheels on said horizontal shafts and bevel-wheels on the upper ends of said vertical shafts, horizontal shafts journaled in said brackets, bevel-wheels on these horizontal shafts engaging the wheels on the upper ends of said vertical shafts, and sharp-toothed wheels mounted on said last-named horizontal shafts, a movable platform supported upon the said body of said vehicle, and engaged by said sharp-toothed wheels, a paper on said platform, a pencil adjustably held with its point on said paper, means substantially as specified for actuating said train of wheels, and means substantially as described for holding said pencil, all substantially as and for the purpose set forth.

2. The combination with a vehicle comprising a body and supporting axles and wheels, of a train of wheels, comprising horizontal shafts journaled on said body, bevel-wheels mounted on said shafts, vertical revoluble sleeves journaled in said body, segmental wheels meshing together on the lower ends of said sleeves, and brackets upon the upper ends of said sleeves and moving with them, bars connecting one of said segmental wheels with the fore axle of said vehicle, vertical shafts revolving in said sleeves, bevel-wheels on the lower ends of said vertical shafts engaging the bevel-wheels on said horizontal shafts, and bevel-wheels upon the upper ends of said vertical shafts horizontal shafts journaled in said brackets, bevel-wheels on these horizontal shafts engaging the bevel-wheels on the upper ends of said vertical shafts, and sharp-toothed wheels mounted on said last-named horizontal shafts, a movable platform supported upon said body of said vehicle, and engaged by said sharp-toothed wheels, a paper on said platform a pencil held with its point on said paper, means substantially as specified for actuating said train of wheels, and means substantially as described for holding said pencil, all substantially as and for the purpose set forth.

3. The combination with a vehicle comprising a body and supporting axles and wheels, of a pulley on the hub of one of said supporting-wheels, a train of wheels comprising horizontal shafts journaled on said body, pulleys on said shafts connected together and to said pulley on said hub of said supporting-wheel, by belts as specified, bevel-wheels mounted on said shaft, vertical revoluble sleeves journaled in said body, segmental wheels meshing together on the lower ends of said vertical sleeves and brackets upon the upper ends of said sleeves and moving with them, bars connecting one of said segmental wheels with the fore axle of said vehicle, vertical shafts revolving in said sleeves, bevel-wheels on the lower ends of said vertical shafts engaging the bevel-wheels on said horizontal shafts, and bevel-wheels upon the upper ends of said vertical shafts, horizontal shafts journaled in said brackets, bevel-wheels on these horizontal shafts engaging the bevel-wheels on the upper ends of said vertical shafts, and sharp-toothed wheels mounted on said last-named horizontal shafts, a movable platform mounted on said body of said vehicle, and engaged by said platform, a pencil held with its point on said paper, a bracket a hub on said bracket, and a thumb-screw in said hub, adjustably holding said pencil all substantially as and for the purpose set forth.

In testimony that I claim the foregoing as my invention I have signed my name, in presence of two witnesses, this 14th day of June, 1900.

LOUIS RIEBE.

Witnesses:
J. GLUCK,
THOMAS J. MELLEY.